3,301,884
β-ARYLSULFONYLETHYL THIOSULFURIC ACIDS

Fritz Meininger and Ernst Hoyer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Oct. 6, 1964, Ser. No. 401,983
Claims priority, application Germany, Oct. 12, 1963, F 40,971
6 Claims. (Cl. 260—453)

The present invention relates to β-arylsulfonylethyl thiosulfuric acids and a process for preparing them, and especially to β-arylsulfonylethyl thiosulfuric acids of the formula $$R-SO_2-CH_2-CH_2-S-SO_3X$$

wherein R represents an aromatic radical which may contain further substitutents, such as nitro-, amino-, alkyl-, alkoxy- or hydroxyl groups and halogen atoms, and X represents an alkali metal or hydrogen atom.

Now we have found that β-arylsulfonylethyl thiosulfuric acids of the formula $$R-SO_2-CH_2-CH_2-S-SO_3X$$

wherein R represents an aromatic radical which may contain further substitutents, such as nitro-, amino-. alkyl-, alkoxy- or hydroxyl groups and halogen atoms, and X represents an alkali metal or hydrogen atom, can be prepared by reacting vinyl sulfonyl compounds of the formula $$R-SO_2-CH=CH_2$$

wherein R has the above meaning, with salts of the thiosulfuric acid at pH values ranging from 3 to 8.5.

As salts of the thiosulfuric acids there may be used the alkali metal or alkaline earth metal salts, especially sodium thiosulfate in the anhydrous form and in the form of the hydrate.

The reaction may be carried out in an aqueous medium or in an organic medium. As solvents there are used in many cases mixtures of water and organic solvents. As organic solvents there may be used, for example, methyl alcohol, ethyl alcohol, acetone, methyl ethyl ketone, dioxane, dimethyl sulfoxide or tetrahydrofurane.

The reaction temperature may vary within wide limits; it is advantageous to carry out the reaction at temperatures within the range of from 10° to 100° C.

The reaction of salts of thiosulfuric acid with vinyl sulfonyl compounds proceeds easily and in good yield according to the prcoess of the present invention. The decomposition of thiosulfate, otherwise observed in acid solution, only occurs in a lesser degree.

Since the reaction proceeds according to the following equation $$R-SO_2-CH=CH_2 + S_2O_3^= + H^+$$
$$\rightarrow R-SO_2-CH_2-CH_2-SSO_3^-$$

hydrogen ions are continuously consumed in the course of the conversion. In order to maintain the pH value, acid must, therefore, be added which is either done by adding the acid as the reaction proceeds or, especially in the case of a weak acid, by adding the total required amount of the acid to the reaction mixture already in the beginning of the reaction. As acids there may be used mineral acids, for example sulfuric acid, hydrochloric acid, phosphoric acid or organic acids, for example formic acid or acetic acid.

Generally the vinyl sulfonyl compound and the thiosulfate used are applied in a molar ratio of 1:1. In many cases, however, it was found to be advantageous to apply the salt of thiosulfuric acid in an excess amount. The two components are dissolved or suspended in the chosen solvent which is heated to the desired reaction temperature, and the respective acid is then added while controlling the pH value continuously.

In a modification of the reaction the vinyl sulfonyl compound and the calculated amount of a weak acid which, if necessary, may be buffered with one of its alkali metal salts, are dissolved in one of the said solvents, and then the thiosulfate is added.

In a further modification of the invention, the sodium thiosulfate solution is placed in the reaction vessel, and the vinyl sulfonyl compound and the acid are introduced simultaneously while controlling the pH value.

The isolation of the reaction products formed depends essentially on the solubility properties of the compounds obtained, which properties differ very much from one another. The said compounds can often be precipitated from aqueous or aqueous-organic media in a good yield by the addition of alkali metal salts such as sodium or potassium chloride, at pH values ranging from about 4 to 8, in the form of the salts thereof which correspond to the formula $$R-SO_2-CH_2-CH_2-S-SO_3Y$$

wherein Y represents an alkali metal atom.

It is furthermore possible, especially when the radical R carries an amino group, to separate the β-arylsulfonylethyl thiosulfuric acids by acidifying the reaction mixture with mineral acids in the form of the internal salts thereof which correspond to the formula $$H_3\overset{+}{N}-R-SO_2-CH_2-CH_2-S-SO_3^-$$

It is also possible to dispense with the isolation of the process products and to use the solutions obtained immediately for further reactions, for example in the manufacture of dyestuffs.

The novel β-arylsulfonylethyl thiosulfuric acids obtained by the process of the invention, which correspond to the formula $$R-SO_2-CH_2-CH_2-S-SO_3X$$

are valuable intermediate products, especially for the manufacture of dyestuffs. They may, for example, be applied to cotton in the form of an aqueous solution or printing paste and fixed fast by treating the padded or printed fiber material with an agent having an alakline action, preferably at an elevated temperature, the sulfonylethyl thiosulfuric acid groups reacting with the groups of the fiber material that are capable of reacting. The fixed compounds can then be diazotized on the fiber, or first be reduced and then be diazotized and coupled with any desired azo component to yield a water-insoluble azo dyestuff having good fastness properties.

The β-arylsulfonylethyl thiosulfuric acids of the above formula which are obtained by the process of the invention differ advantageously from the known compounds of the formula $$R-SO_2-CH_2-CH_2-OSO_3X$$

wherein R and X have the above meanings by being resistant to the action of alkalies in a higher degree. This constitutes a considerable advance in the art since the compounds obtained by the process of the present invention can be used in the manufacture of dyestuffs at higher pH values.

The following examples serves to illustrate the invention but they are not intended to limit it thereto; the relationship of parts by weight to parts by volume being the same as that of the kilogram to the liter:

Example 1

183 parts by weight of 1-aminobenzene-3-vinyl-sulfone and 250 parts by weight of sodium thiosulfate containing crystal water were introduced into 1000 parts by weight of water and warmed up to 50° C., with agitation. The pH value of the mixture was adjusted to 5.2–5.7 by dropping in acetic acid of 50% strength and maintained at this value for about one hour. After this period, the acid consumption ceased and a clear solution formed which was cooled to 10° to 20° C. and then acidified with 200 parts by weight of concentrated hydrochloric acid. The white crystalline product which had precipitated was filtered off with suction, washed with a small amount of methanol and dried. There were obtained 254 parts by weight of the compound corresponding to the formula

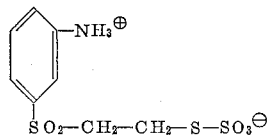

in the form of a 97 to 98% product which melted with decomposition at 210° to 211° C.

Example 2

183 parts by weight of 1-aminobenzene-3-vinylsulfone and 250 parts by weight of sodium thiosulfate containing crystal water were introduced into a mixture consisting of 2000 parts by volume of water and 1000 parts by volume of ethyl alcohol and warmed up to 50° C., with agitation. The pH value was maintained within the range of 5.2 to 5.7 by dropping in acetic acid of 50% strength. After the reaction was complete, the solution was acidified with about 200 parts by weight of concentrated hydrochloric acid and, after cooling to 0°–5° C., the precipitated product was filtered off with suction. It was washed with a small amount of methyl alcohol and dried at 60° C. There were obtained 252 parts by weight of the compound described in Example 1 with a decomposition point of 211° to 212° C.

Example 3

213 parts by weight of 1-amino-2-methoxybenzene-5-vinylsulfone and 250 parts by weight of sodium thiosulfate containing crystal water were introduced into a mixture of 1000 parts by volume of ethyl alcohol and 2000 parts by volume of water and heated to 50° C. The pH value was adjusted to 5–5.5 by dropping in acetic acid of 50% strength and maintained at this value until the reaction was complete. The solution was clarified, concentrated by evaporation in vacuo to half the original volume, and the reaction product was then precipitated from the concentrated solution by the addition of sodium chloride. After cooling the separated product was filtered off with suction and dried at 60° C. 410 parts by weight of a white powder were obtained which contained 77% of the compound of the formula

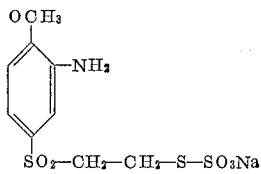

A sample of this compound when dissolved in water, clarified and precipitated by the addition of hydrochloric acid, formed an internal salt which, after being filtered off with suction, washed and dried, had a decomposition point of 241° to 243° C.

Example 4

250 parts by weight of sodium thiosulfate containing crystal water were stirred for one hour with 1000 parts by volume of methyl alcohol, the crystals being dissolved for the most part. Then 125 parts by weight of glacial acetic acid were added and 183 parts by weight of 1-aminobenzene-3-vinylsulfone introduced. The reaction mixture was warmed up to 45° C. and stirred at this temperature for 4½ hours. The reaction mixture was then cooled off to 10°–20° C., clarified and the filtrate acidified at 0–10° C. with 200 parts by weight of concentrated hydrochloric acid. The precipitated crystalline substance was filtered off with suction, washed with methyl alcohol and dried at 60° C. 240 parts by weight of the compound described in Example 1 were obtained whose decomposition point was 210°–211° C.

Example 5

183 parts by weight of 1-aminobenzene-3-vinylsulfone and 250 parts by weight of sodium thiosulfate containing crystal water were introduced into 1500 parts by volume of water and the mixture was warmed up to 50°–55° C. At this temperature the pH value was adjusted to 5.2–5.7 by adding about 320 parts by volume of 5 N hydrochloric acid and maintained at this value for about 3 hours. The reaction mixture was cooled to 0°–10° C., and 200 parts by weight of concentrated hydrochloric acid were added to the solution formed. The precipitated crystalline product was filtered off with suction, washed with methyl alcohol and dried. 270 parts by weight of the compound described in Example 1 were obtained.

Example 6

125 parts by weight of glacial acetic acid and 183 parts by weight of 1-aminobenzene-3-vinylsulfone were introduced into 1000 parts by volume of water and warmed up to 65° to 70° C. At this temperature a solution of 250 parts by weight of sodium thiosulfate containing crystal water, dissolved in 300 parts by volume of water, was dropped into this mixture in the course of 1 hour. The mixture was stirred for 3½ hours at 65°–70° C. and then cooled to 0°–10° C. 200 parts by weight of concentrated hydrochloric acid were added to the solution. The precipitated crystalline substance was filtered off with suction, washed with water and methyl alcohol and dried. 275 parts by weight of the compound described in Example 1 were obtained.

Example 7

250 parts by weight of sodium thiosulfate were dissolved in 1000 parts by weight of water and warmed up to 70°–75° C. Then a solution of 183 parts by weight of 1-aminobenzene-3-vinylsulfone in 500 parts by volume of methyl alcohol and about 130 parts by volume of acetic acid of 50% strength were added dropwise simultaneously in the course of 1 hour at a pH value of 6.0–6.5. The mixture was stirred for another hour at 70°–75° C., and cooled to 0°–10° C. At this temperature concentrated hydrochloric acid was added until the reaction mixture had a distinctly acid reaction on Congo red paper. The precipitated crystalline product was filtered off with suction, washed and dried. 270 parts by weight of the compound described in Example 1 were obtained.

Example 8

183 parts by weight of 1-aminobenzene-4-vinylsulfone and 250 parts by weight of sodium thiosulfate containing crystal water were introduced into 2000 parts by volume of water and warmed up to 50° C. At this temperature the pH value was adjusted to 5.0–5.5 by the addition of acetic acid of 50% strength and maintained constant for about 3 hours. The reaction mixture was cooled off to 10°–20° C., clarified and mixed with 250 parts by weight of potassium chloride. The precipitated product was filtered off with suction and dried. 300 parts by weight of a white powder were obtained containing 74% of the compound of the formula

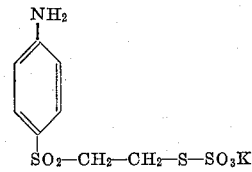

A sample of the compound, when dissolved in water, clarified and precipitated by the addition of hydrochloric acid, formed an internal salt which, after being filtered off with suction, washed and dried, had a decomposition point of 244° C.

*Example 9*

262 parts by weight of 1-amino-2-bromobenzene-4-vinylsulfone were introduced into a mixture consisting of 1000 parts by volume of acetone and 1000 parts by volume of water. 250 parts by weight of sodium thiosulfate containing crystal water were added and the mixture warmed up to 50° C. At this temperature the pH value was maintained at 5.2–5.7 for 3 hours by the addition of about 250 parts by volume of acetic acid of 50% strength. The solution was clarified and the reaction product precipitated at 10°–20° C. by the addition of potassium chloride. The product was filtered off with suction, washed and dried. 365 parts by weight of a white powder were obtained which contained 92% of the compound of the formula

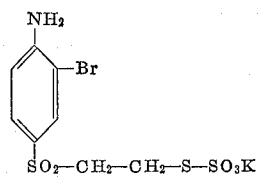

When a sample of this compound was dissolved in water, clarified and the filtrate precipitated with hydrochloric acid, it formed a crystalline internal salt which, after being filtered off with suction, washed and dried, had a decomposition point of 194° to 195° C.

*Example 10*

183 parts by weight of 1-aminobenzene-4-vinylsulfone and 250 parts by weight of sodium thiosulfate containing crystal water were introduced into 2000 parts by volume of water and warmed up to 50° C. The pH value was adjusted to 8–8.5 at this temperature by the addition of acetic acid of 50% strength and maintained constant for about 2 hours. When acid was no longer taken up, the reaction mixture was stirred for 8 hours at 50° C. For removing a minor residue, the solution was filtered off with suction. The reaction product was precipitated with potassium chloride from the filtrate, filtered off with suction and dried. 210 parts by weight of a white powder were obtained which contained 82% of the compound indicated in Example 8.

The following table contains a number of further β-arylsulfonyl-ethyl-thiosulfuric acids which can be obtained from the corresponding vinyl sulfonyl compounds according to the process of the invention.

| No. | Composition | Properties |
|---|---|---|
| 1 | $NH_2$ / -$NO_2$ / $SO_2-CH_2-CH_2-S-SO_3Na$ | Water-soluble yellow crystalline compound (decomposition point 145–146° C.). |
| 2 | $NH_2$ / Cl- -Cl / $SO_2-CH_2-CH_2-S-SO_3K$ | Water-soluble white crystalline compound (decomposition point 217–219° C.). |
| 3 | OH / -$NO_2$ / $SO_2-CH_2-CH_2-S-SO_3Na$ | Water-soluble yellow crystalline compound (decomposition point 131–133° C.). |
| 4 | $OCH_3$ / -$NO_2$ / $SO_2-CH_2-CH_2-S-SO_3K$ | Water-soluble white crystalline compound (decomposition point 184–186° C.). |
| 5 | $CH_3$ / -$NO_2$ / $SO_2-CH_2-CH_2-S-SO_3Na$ | Water-soluble white crystalline compound (decomposition point 130–132° C.). |

| No. | Composition | Properties |
|---|---|---|
| 6 | 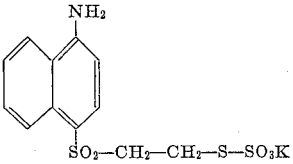 | Water-soluble white crystalline compound (decomposition point 193°–195° C.). |
| 7 | 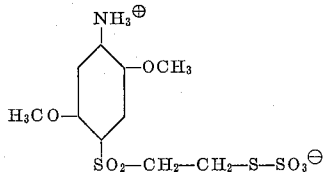 | White crystalline compound (decomposition point 147–152° C.), soluble in water with the addition of a small amount of sodium bicarbonate with the evolution of gas. |

The decomposition points indicated in the examples can vary to some extent depending on the rate of heating.

We claim:

1. A compound of the formula

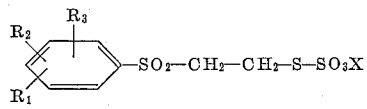

wherein $R_1$ represents nitro or amino, $R_2$ represents hydrogen, halo or lower alkoxy, $R_3$ represents hydrogen, halo, lower alkyl, lower alkoxy or hydroxyl, and $R_2$ and $R_3$ linked to adjacent carbon atoms taken together with the benzene nucleus represent an α-naphthyl group, and X represents hydrogen, sodium or potassium.

2. The compound of the formula

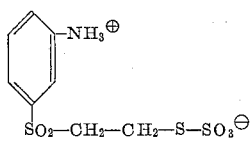

3. The compound of the formula

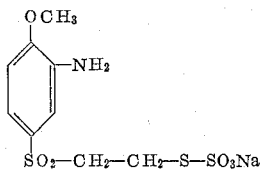

4. The compound of the formula

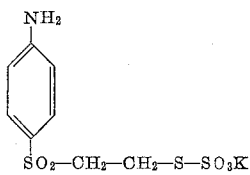

5. The compound of the formula

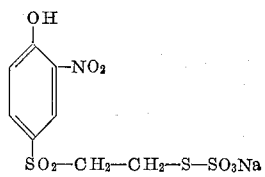

6. The compound of the formula

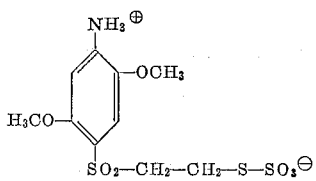

References Cited by the Examiner
UNITED STATES PATENTS
3,153,077   10/1964   Tesoro _____ 260—453

CHARLES B. PARKER, *Primary Examiner.*
DALE R. MAHANAND, *Assistant Examiner.*